United States Patent [19]

Crosby et al.

[11] Patent Number: 4,481,226

[45] Date of Patent: Nov. 6, 1984

[54] STABILIZED ANTHOCYANIN FOOD COLORANT

[75] Inventors: Wayne H. Crosby, Tarrytown; Charles V. Fulger, Millwood, both of N.Y.; Gerhard J. Haas, Woodcliff Lake, N.J.; Donna M. Nesheiwat, Yonkers, N.Y.

[73] Assignee: General Foods Corporation, White Plains, N.Y.

[21] Appl. No.: 363,973

[22] Filed: Mar. 31, 1982

[51] Int. Cl.$^3$ .............................................. A23L 1/272
[52] U.S. Cl. .................................... 426/540; 426/250; 426/655; 8/438; 8/506; 8/646
[58] Field of Search ....................... 426/250, 540, 655; 8/438, 506, 646

[56] References Cited

U.S. PATENT DOCUMENTS

| 3,511,667 | 5/1970 | Schramm | 426/250 |
|---|---|---|---|
| 3,655,406 | 4/1972 | Klaui | 426/540 |
| 4,208,434 | 6/1980 | Iacobucci | 426/250 |
| 4,307,117 | 12/1981 | Leshik | 426/540 |

FOREIGN PATENT DOCUMENTS 330547 2/1976 U.S.S.R. .............................. 426/250

OTHER PUBLICATIONS

Rose, The Condensed Chemical Dictionary 7th Ed., Reinhold Pub. Corp., New York, 1968, p. 917.
Marmion, D. M., Handbook of U.S. Colorants for Foods, Drugs, and Cosmetics, Wiley-Interscience Pub., John Wiley & Sons, N.Y., p. 90, 1979.
"Evaluation of the Health Aspects of Tannic Acid as a Food Ingredient", Bureau of Foods, Food and Drug Administration, Department of Health, Education, and Welfare, pp. 1-5, 1977, Contract No. FDA 223-75-2004.

Primary Examiner—Jeanette M. Hunter
Attorney, Agent, or Firm—Joseph T. Harcarik; Sam Walker; Thomas R. Savoie

[57] ABSTRACT

The storage and light stability of an anthocyanin food colorant obtained by extraction from grape pomace is enhanced by combination with tannic acid.

5 Claims, No Drawings

STABILIZED ANTHOCYANIN FOOD COLORANT

BACKGROUND OF THE INVENTION

This invention relates to food colorants. In particular, it relates to an anthocyanin food colorant obtained by extraction of grape pomace. Food colorants of this type have been known for many years. The colorants, and methods of obtaining them from grape pomace, are well described in the literature such as: "Anthocyanins-Occurrence, Extraction and Chemistry" by C. F. Timberlake, *Food Chemistry*, Vol. 5, pages 69–80 (1980); "Anthocyanins and Their Solubility in Foods" by P. Markakis, *CRC Critical Review in Food Technology*, Volume 4, Issue 4, pages 437–456 (1974); "Purification of Commercial Grape Pigment" by R. I. Lin et al, *Journal of Food Science*, Volume 45, pages 297–309 (1980).

It is also known that the color of this anthocyanin colorant can be enhanced or stabilized when combined with other materials. Examples in the literature include: "Anthocyanins: Color Augmentation with Catechin and Acetaldehyde", by C. F. Timberlake et al, J. Sci. Fd. Agric. Vol. 28, pages 539–544 (1977); "Process for Enhancing the Sunlight Stability of Anthocyanic Pigments, Iacobucci, U.S. Pat. No. 4,285,982; "Stability of Grape Anthocyanin in a Carbonated Beverage" by N. Palamidis et al, *Journal of Food Science*, Volume 40, pages 1047–1049 (1975).

It is an object of the present invention to provide a stabilized anthocyanin grape extract colorant and to provide a method of making same, and it is a further object to provide food products colored with that colorant.

BRIEF DESCRIPTION OF THE INVENTION

The foregoing and other objects which will be apparent to those of ordinary skill in the art are achieved in accordance with the present invention by providing a stabilized anthocyanin grape extract colorant comprising an anthocyanin grape extract colorant combined with tannic acid, and by providing food products colored therewith. The stabilized colorant is readily produced in accordance with the invention by combining tannic acid and anthocyanin grape extract colorant in an appropriate solvent, and recovering the product.

DETAILED DESCRIPTION

The anthocyanin grape extract colorant can be any of the commercially available materials but is preferably one which is obtained by aqueous extraction of red or black grape pomace with aqueous alcoholic solutions containing water and 25–75% by volume of ethyl alcohol and preferably 25–40% for greatest clarity. Throughout the extraction the temperature should be held below about 30° C. otherwise browning or other undesirable conditions may develop. In a preferred manner of practicing the invention, the tannic acid is added to the extract solution prior to recovery of the colorant. The colorant is preferably recovered, after addition of the tannic acid, by a two stage drying process including evaporation followed by spray drying with a suitable carrier such as dextrin.

Tannic acid, which is used in the present invention, is a hydrolyzable gallotannin and is also a hydrolyzed tannin and structurally distinct from the latter. It is known to add tannins to anthocyanins, including anthocyanins from grape pomace. However, tannins are quite distinct, structurally, from tannic acid and we have found that the addition of tannins does not enhance stability as when tannic acid is used in accordance with the present invention. This difference is shown in Example 3 which follows. Food grade tannic acid is available commercially. The amount of tannic acid which will combine with the colorant will vary somewhat with the particular extract, but will generally be from 5 to 25% by weight, based on the solids content of the colorant.

In making the stabilized product, the tannic acid and colorant are combined in a suitable solvent, conveniently the solvent used to extract the pigment from the grape pomace. The tannic acid may be admixed in an amount in excess of that which will combine with the anthocyanin colorant and an amount of 5 to 50% by weight, based on the solids content of the colorant, is generally suitable.

Where the tannic acid is added to the extract solution resulting from the extraction of grape pomace, the tannic acid may be added directly or after dissolving in a suitable compatible solvent. Where the extract colorant is obtained as such, a suitable solvent is selected in which to effect combination of the colorant and tannic acid. Water, alcohols, or admixtures thereof are suitable solvents. After the materials are combined, the solvent is removed in any convenient manner such as evaporation followed by spray drying as described above. The product is preferably spray dried and may contain a suitable food quality spray drying carrier, such as dextrin. Such carriers are used in varying amounts, generally 25 to 75% by weight of the product.

EXAMPLE 1

De-seeded Ives grape pomace is washed with an approximately equal volume of water and pressed to remove soluble sugars. The washed pomace is then contacted with two volumes of 40% ethanol by volume in water containing hydrochloric acid in an amount sufficient to result in a pH of about 2. After a soak time of one hour at about 22° C., the pomace is pressed to provide an aqueous extract solution containing about 4% grape solids. The pomace can be used as an animal feed constituent. Tannic acid is added to the solution in an amount of 10% by weight based on the weight of the grape solids. The extract is then evaporated in a multiple effect evaporator to produce a concentrate having a solids content of about 20%. Dextrin, in an equivalent amount of about 50% by weight based on the solids content of the concentrate, is added, to form a 20% solids suspension and the concentrate is spray dried to produce a dry particulate colorant. The colorant is used to color a conventional cherryflavored dry beverage mix for seventeen weeks at 90° F., 70% relative humidity with no loss of red color and no perception of "off-flavors".

EXAMPLE 2

A conventional cherry-flavored dry beverage mix is colored with the colorants listed and tested for stability in sunlight and heat.

| Coloring Agent | Color | Flavor | Stability Sunlight | (Half-life) 95° F. |
|---|---|---|---|---|
| A. Example 1 | Clear Red | Fruity | 14 days | 60 min. |
| B. Commercial Grape | Red | Winey | 6 days | 30 min. |

|   | Coloring Agent | Color | Flavor | Stability Sunlight | (Half-life) 95° F. |
|---|---|---|---|---|---|
|   | Pomace Extract Colorant ("GSE$_x$", Spreda) |   |   |   |   |
| C. | Commercial Beet Extract ("S-D", Beatrice Foods) | Red-Pink | Beety | 1 day | 10 min. |

EXAMPLE 3

The effect of tannic acid used in accordance with the present invention is compared with the effect of tannins. In a first series of experiments, an Ives grape pomace extract is made in the manner described in Example 1, except that the tannic acid used in Example 1 is replaced with the addition indicated below. Loss in coloration as a function of exposure to daylight is measured after the indicated time intervals. In a second set of experiments, the same additives are used with a commercial grape skin extract (Spreda). Results are as shown in the table.

| Pomace | Additive (0.1%) | Day 1 | Day 3 | 3 Day Loss (%) | Increase Over Control (%) |
|---|---|---|---|---|---|
|   |   | 0.97 | 0.80 | 18 | 0 |
| Ives | tea tannins | 1.15 | 0.79 | 31 | −1 |
| Ives | tannic acid | 1.25 | 1.04 | 23 | +30 |
| Spreda |   | 0.58 | 0.49 | 16 | 0 |
| Spreda | tea tannins | 0.72 | 0.56 | 22 | +14 |
| Spreda | tannic acid | 0.97 | 0.84 | 13 | +71 |

What is claimed is:

1. A stabilized anthocyanin grape extract colorant comprising an anthocyanin grape extract colorant combined with tannic acid wherein said tannic acid is present in an amount of from 5 to 25% by weight based on the solid contents of said grape extract colorant; wherein said colorant is a spray-dried particulate product further comprising a spray-drying carrier present in an amount of 25 to 75% by weight; and wherein said colorant is color stabilized against sunlight and heat.

2. A colorant according to claim 1 wherein said carrier comprises dextrin.

3. In a food product containing an anthocyanin grape pomace extract colorant, the improvement wherein said colorant comprises an anthyocyanin grape extract colorant stabilized against sunlight and heat with tannic acid wherein said tannic acid is present in an amount of from 5 to 25% by weight based on the solid contents of said grape extract colorant and wherein said colorant is a spray-dried particulate product further comprising a spray-drying carrier present in an amount of 25 to 75% by weight.

4. A method of stabilizing anthocyanin grape extract colorant obtained by extraction from grape pomace which comprises providing a solvent containing said colorant, admixing from 5 to 50% by weight of tannic acid, based on the solid content of the grape extract, and recovering a stabilized colorant comprising the anthocyanin grape extract colorant combined with tannic acid wherein the stabilized colorant is recovered by evaporating solvent to form a concentrate and spray-drying said concentrate wherein a spray-drying carrier is admixed with said concentrate prior to spray-drying and wherein said colorant is color stabilized against sunlight and heat wherein said tannic acid is present in amounts of from 5 to 25% based on a solid content of said grape extract colorant and wherein said colorant has a carrier present in an amount of 25 to 75% by weight and wherein said colorant is color stabilized against sunlight and heat.

5. A method according to claim 4 wherein said carrier comprises dextrin.

* * * * *